United States Patent
Kayzar et al.

(10) Patent No.: US 7,412,226 B2
(45) Date of Patent: Aug. 12, 2008

(54) PUSH-TO-LOCATE WIRELESS COMMUNICATION DEVICE AND METHOD OF USE

(75) Inventors: Brett A. Kayzar, San Diego, CA (US); Kenneth Baar, Escondido, CA (US); Tom J. Zeran, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 113 days.

(21) Appl. No.: 11/080,227

(22) Filed: Mar. 14, 2005

(65) Prior Publication Data

US 2006/0205416 A1    Sep. 14, 2006

(51) Int. Cl.
*H04M 11/04*    (2006.01)

(52) U.S. Cl. ............... 455/404.2; 379/37; 455/90.2; 455/518

(58) Field of Classification Search ......... 455/456.1, 455/463, 457, 404.1, 404.2
See application file for complete search history.

(56) References Cited

U.S. PATENT DOCUMENTS

| | | | | |
|---|---|---|---|---|
| 5,218,716 A * | 6/1993 | Comroe et al. | ........... | 455/426.1 |
| 5,485,163 A * | 1/1996 | Singer et al. | ................ | 342/457 |
| 5,889,492 A * | 3/1999 | Kurby et al. | ............. | 342/357.1 |
| 6,215,994 B1 | 4/2001 | Schmidt et al. | | |
| 6,662,013 B2 * | 12/2003 | Takiguchi et al. | ........ | 455/456.2 |
| 6,941,147 B2 * | 9/2005 | Liou | ...................... | 455/456.5 |
| 2002/0098874 A1 | 7/2002 | Zirul et al. | | |
| 2003/0078064 A1 * | 4/2003 | Chan | ........................... | 455/514 |
| 2003/0100294 A1 * | 5/2003 | Hosono | ...................... | 455/414 |
| 2004/0002305 A1 * | 1/2004 | Byman-Kivivouri et al. | ..... | 455/41.2 |
| 2004/0046637 A1 | 3/2004 | Wesby Van Swaay | | |
| 2004/0058698 A1 * | 3/2004 | Crockett et al. | ............. | 455/518 |
| 2004/0132480 A1 * | 7/2004 | Parker et al. | ............. | 455/550.1 |
| 2004/0137918 A1 * | 7/2004 | Varonen et al. | .......... | 455/456.2 |
| 2004/0192364 A1 * | 9/2004 | Ranalli et al. | ............... | 455/517 |
| 2004/0198376 A1 * | 10/2004 | Chandhok et al. | ........ | 455/456.1 |
| 2005/0124367 A1 * | 6/2005 | Hassan et al. | ............... | 455/518 |
| 2005/0153724 A1 * | 7/2005 | Vij et al. | ..................... | 455/518 |
| 2005/0186970 A1 * | 8/2005 | Yates et al. | .............. | 455/456.5 |
| 2005/0202836 A1 * | 9/2005 | Schaedler et al. | ........... | 455/466 |
| 2005/0239477 A1 * | 10/2005 | Kim et al. | ................ | 455/456.1 |
| 2005/0282557 A1 * | 12/2005 | Mikko et al. | ............. | 455/456.1 |
| 2006/0183486 A1 * | 8/2006 | Mullen | ..................... | 455/456.1 |

FOREIGN PATENT DOCUMENTS

| | | |
|---|---|---|
| FR | 2858902 | 2/2002 |
| WO | WO 99/13629 * | 3/1999 |
| WO | WO 2004/091175 | 10/2004 |

* cited by examiner

*Primary Examiner*—Duc Nguyen
*Assistant Examiner*—Huy C Ho

(57) ABSTRACT

A wireless communication device for geographically locating a second wireless communication device includes a housing; a push-to-locate activation mechanism configured to detect selection of a target number corresponding to the second wireless communication device and send a push-to-locate request for the target number to a carrier network to obtain a geographical location of the second wireless communication device using a location-based service; and a display configured to present a geographical location of the second wireless communication device received in response to the push-to-locate request.

10 Claims, 13 Drawing Sheets

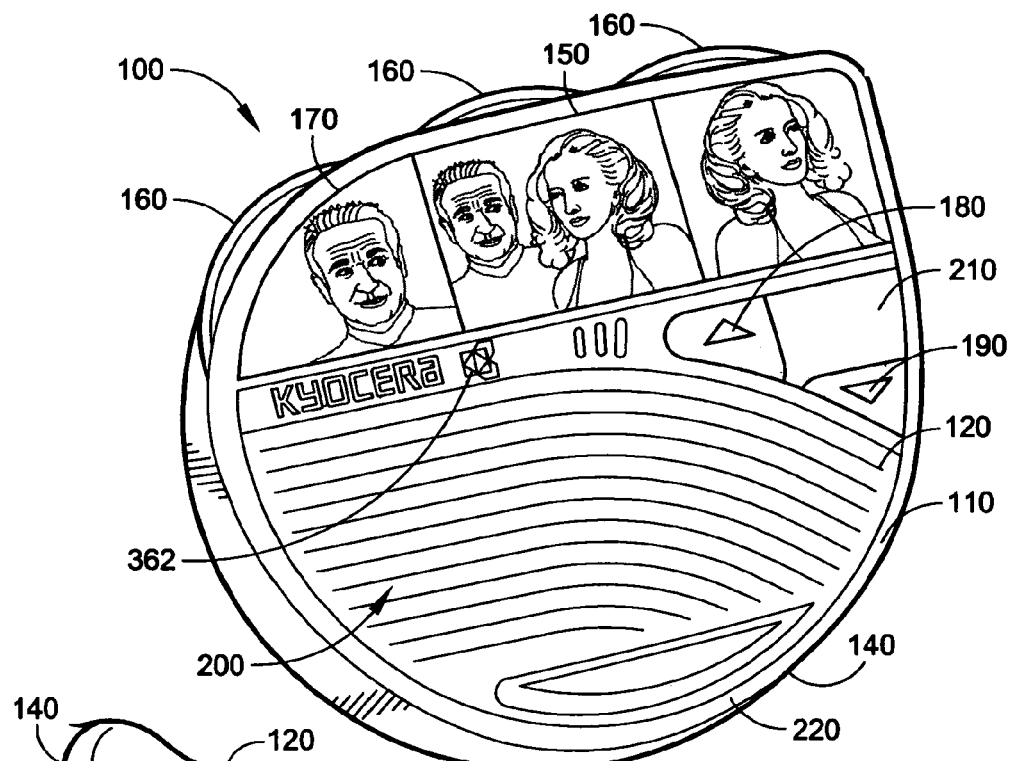
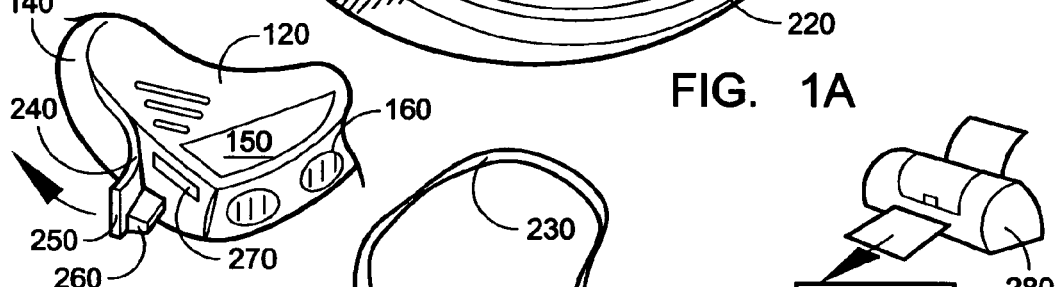
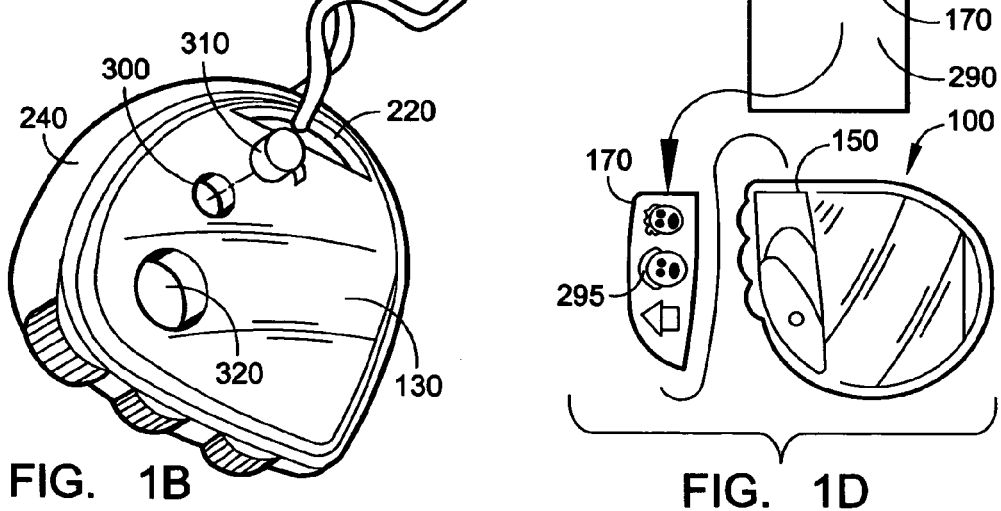
FIG. 1A
FIG. 1C
FIG. 1B
FIG. 1D

PUSH-TO-LOCATE WIRELESS COMMUNICATION DEVICE AND METHOD OF USE

FIELD OF THE INVENTION

The present invention generally relates to locating wireless communication devices and more specifically relates to locating push-to-talk wireless communication devices.

RELATED ART

Wireless communication devices such as cell phones are widely used to place and receive phone calls. Placing a phone call with a cell phone typically requires either 1) a user to dial a telephone number on a keypad and press "send", or 2) a user to navigate through a list of frequently called numbers/contacts displayed on a LCD screen and to initiate a call (e.g., press "send") once the correct number/contact is highlighted. When receiving a call, a user is alerted of the incoming call through, for example, an audible ring, and the user selects a specific key to answer the call. Information on the caller is often displayed on the LCD screen. Although these procedures for placing and receiving calls are not too complicated for many individuals, especially those in the age range of 13-69 years old, for children (e.g., 7-12 years old) and older adults (e.g., 70+ years old), these procedures can be complicated. In view of the complexity of cell phones, children and older adults often do not use these devices. As a result, immediate communication with such individuals is difficult or impossible during important or emergency situations involving the child or older adult. In addition to not being able to communicate with children or older adults, one does not know where to locate the individual during important or emergency situations. Knowing the location of the individual during important or emergency situations is imperative for rendering immediate assistance to the individual.

Therefore, in addition to the need for a wireless communication device and method that is so simple that children and older adults can place and receive calls easily, a need exists for a push-to-locate ("PTL") wireless communication device and method that allows one to quickly and easily locate the wireless communication device so that the child or older adult using the wireless communication device can be immediately located if the individual is lost, missing, or involved in an emergency situation where immediate assistance is required.

SUMMARY

Accordingly, an aspect of the invention involves a wireless communication device for geographically locating a second wireless communication device. The wireless communication device includes a housing; a push-to-locate activation mechanism configured to detect selection of a target number corresponding to the second wireless communication device and send a push-to-locate request for the target number to a carrier network to obtain a geographical location of the second wireless communication device using a location-based service; and a display configured to present a geographical location of the second wireless communication device received in response to the push-to-locate request.

Another aspect of the invention involves a wireless communication and location system for geographically locating a target wireless communication device. The system includes one or more base stations; a target wireless communication device configured to place a call to and receive a call from a contact of a select number of contacts, and to limit outgoing calls to the select number of contacts; and a locating wireless communication device communicatively coupled with the target wireless communication device through the one or more base stations and configured to obtain and display the geographical location of the target wireless communication device.

A further aspect of the invention involves a computer readable medium having stored thereon one or more sequences of instructions for causing one or more microprocessors to perform the steps for geographically locating a second wireless communication device using a wireless communication device including a push-to-locate actuation mechanism, and a display. The steps including detecting selection of a push-to-locate activation mechanism; detecting selection of a target number corresponding to the second wireless communication device; establishing a connection with a carrier network; sending a push-to-locate request for the target number to the carrier network to obtain a geographical location of the second wireless communication device using a location-based service; receiving the geographical location of the second wireless communication device; displaying the geographical location of the second wireless communication device with the display.

A still further aspect of the invention involves a wireless communication device for geographically locating a second wireless communication device. The wireless communication device includes a housing; a push-to-locate activation mechanism; a display; a module to detect selection of a push-to-locate activation mechanism; a module to detect selection of a target number corresponding to the second wireless communication device; a module to establish a connection with a carrier network; a module to send a push-to-locate request for the target number to the carrier network to obtain a geographical location of the second wireless communication device using a location-based service; a module to receive the geographical location of the second wireless communication device; and a module to display the geographical location of the second wireless communication device with the display.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1A is a front perspective view of an embodiment of a wireless communication device;

FIG. 1B is a rear perspective view of the wireless communication device illustrated in FIG. 1A;

FIG. 1C is a partial bottom perspective view of the wireless communication device illustrated in FIG. 1A;

FIG. 1D is a block diagram illustrating a system and method for adding graphics (e.g., pictures) to the pre-programmed keys of the wireless communication device of FIG. 1A;

DETAILED DESCRIPTION

Figure 2:
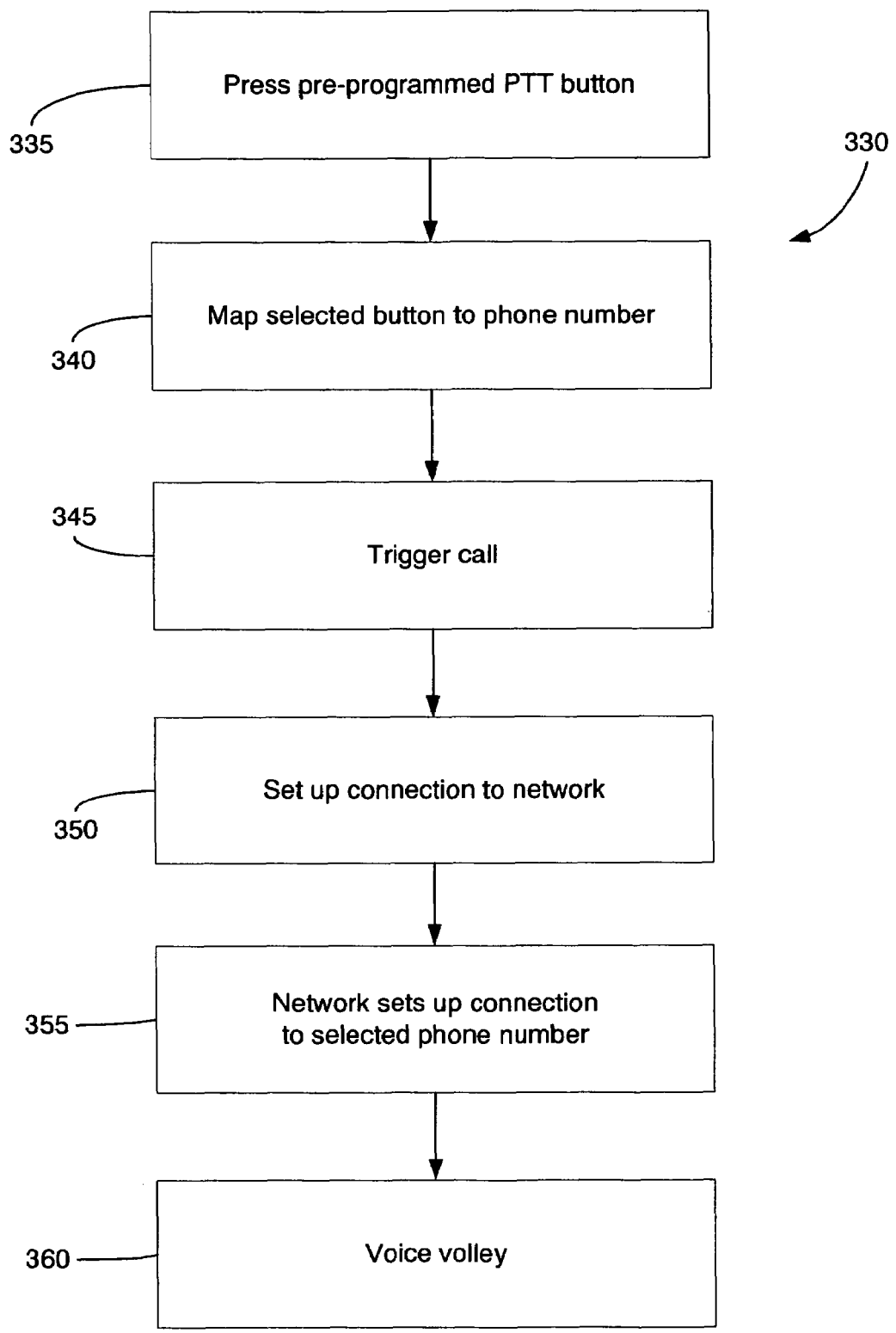
FIG. 2 is a flowchart of an exemplary method of placing a call with the wireless communication device illustrated in FIG. 1A.

An aspect of the present invention relates to a push-to-locate ("PTL") wireless communication device and method for geographically locating a wireless communication device carried by, for example, children or the elderly. The wireless communication device carried by children/elderly will first be described in detail below before describing the PTL wireless communication device and method.

Both the PTL wireless communication device and the wireless communication device carried by children/elderly will be described as push-to-talk ("PTT") wireless communication devices for sending and receiving PTT wireless communications, which are ½ duplex wireless communications. After reading the description below it will become apparent to one skilled in the art having the benefit of this disclosure how to implement the invention in various alternative embodiments and alternative applications. For example, but not by way of limitation, the embodiments and methods described herein apply to voice wireless communication devices (e.g., cellular handsets) for placing and receiving voice calls. However, although various embodiments of the present invention will be described herein it is understood that these embodiments are presented by way of example only, and not limitation. As such, this detailed description of various alternative embodiments should not be construed to limit the scope or breadth of the present invention as set forth in the appended claims.

With reference to FIGS. 1A-1C, an embodiment of a PTT wireless, display-less, keypad-less communication device ("PTT device") 100 will first be described. As used herein, "display-less" means that the communication device does not include a conventional display such as, but not limited to, a LCD display, which displays varying letters, numbers, symbols, or graphics. As used herein, "keypad-less" means that the communication device does not include a conventional numbered keypad (e.g., standard phone keypad) or text keypad (e.g., QWERTY) keypad, although the device may include certain functional buttons as described below. The PTT device 100 greatly simplifies the placing and receiving of wireless communications to and from a limited number of personal contacts (e.g., mom, dad). The PTT device 100 is so simple that it may be used by users of all age groups, and, in particular, by users that previously did not use wireless communication devices or services (e.g., children that are 7-12 years old and adults 70+ years old).

The PTT device 100 includes a generally tear-shaped, hard-plastic housing 110 that houses hardware and software for operating the PTT device 100 in a manner described herein. Although not shown, one of the hardware components in the housing 110 includes a GPS receiver, which can be used for locating the PTT device 100.

The PTT device 100 includes a front 120 (FIG. 1A), a rear 130 (FIG. 1B), and a periphery 140. The front 120 includes an icon window 15 that graphics 170 may be inserted behind to graphically label corresponding PTT buttons 160 adjacent thereto. Volume control buttons 180, 190 are carried by the front 120 of the PTT device 100 for adjusting the volume of speaker 200. A talk button 210 may be disposed adjacent the volume control buttons 180, 190. A user holds down the talk button 210 while talking. One or more removable and mountable front covers may be provided for the PTT device 100 to appeal to either the young, the elderly, or other groups.

An attachment loop 220, which an attachment strap or lanyard 230 may be connected to, is provided in the PTT device 100. The attachment strap 230 allows a user (e.g., child, elderly) to wear the PTT device 100 around the user's neck, or to secure the PTT device 100 to the user's wrist during use.

The PTT device 100 includes a rubber gasket 240 along the periphery 140 of the PTT device 100. The rubber gasket 240 includes the PTT buttons 160 integrated therein. The rubber gasket 240 provides a friction surface to facilitate gripping of the PTT device 100 with user's hands, and helps to prevent damage to the PTT device 100 if the PTT device 100 is accidentally dropped.

As shown in FIGS. 1C and 1D, to add (or change graphics) behind the window 150, an end 250 of the gasket 240 including a tab 260 is peeled back from a window slot 270. The graphics 170 may be created using software on a computer, and printed out as a graphics page 290. The graphics 170 may be cut-out of the printed graphics page 290, and then inserted through the slot 270, behind the window 150. The graphics 170 includes a separate icon corresponding to each PTT button 160 so that a user can easily identify which PTT button 160 to press to make a PTT call to a person corresponding to the icon. The icon may be, for example, but not by way of limitation, a photo of the contact. Thus, the graphics 170 corresponding to each button 160 are customizable.

Behind each icon in the window 150, the PTT device 100 includes a respective LED (or a group of LEDs), which illuminate(s) upon receiving a PTT call. The LED(s) may be white or colored LED(s). Illumination of the LED(s) behind the respective icon indicates to the user who the caller is. The user takes the call by pushing the PTT button 160 corresponding to the illuminated image. The PTT device 100 may include one or more additional alarms (e.g., vibration of PTT device 100, ring) that are activated upon receipt of a PTT call to notify the user of an incoming call of the PTT device 100.

With reference to FIG. 1B, the rear 130 of the PTT device 100 includes an emergency (e.g., 911) button 300 covered by a removable cap 310. To place an emergency call to 911, the cap 310 is removed and the button 300 is pushed by the user. The rear 130 of the PTT device 100 also includes a large group contacts button 320, which is pressed to place a call to all the pre-programmed contacts (e.g., mom, dad, brother). The PTT device 100 may include a switch to switch the PTT device 100 between one or more of the following alert modes: illumination mode, vibration mode, ring/tone mode.

In alternative embodiments of the invention, the PTT button 160 may be part of the graphics 170 and the window 150, so that a user may press the appropriate PTT button 160 by pressing the window and icon corresponding to the button 160.

Although a user can only call out to a predetermined number of contacts, in an embodiment of the PTT device 100, the user may receive calls from phone numbers other than those of the predetermined contacts. For example, one of the PTT buttons 160 may be assigned to mom's cell phone, which mom would usually use to call the user. However, mom would be able to call from a home line, even if the home telephone number was not assigned to one of the PTT buttons 160, and the user would be able to take the call by pressing the PTT "talk" button. In alternative embodiments, the PTT device 100 may only accept calls from predetermined numbers, or the PTT device 100 may be configured for more than one mode (e.g., a first mode where the PTT device 100 only accept calls from predetermined numbers, and a second mode where the PTT device 100 accept calls from numbers in addition to the predetermined numbers).

With reference to FIG. 2, a method 330 for placing a PTT call to a pre-programmed contact with the PTT device 100 will now be described. At step 335, the user selects one of the pre-programmed PTT buttons 160 corresponding to the icon representative of the contact. The user presses the PTT button 160 associated with the icon of the contact the user desires to call. This causes hardware/software in the PTT device 100, at step 340, to map the selected PTT button 160 to the contact's phone number. At step 345, a call is triggered to the contact's phone number with the PTT device 100. At step 350, a connection to a communication network is set up. At step 355, the communication network sets up a connection to the contact's phone number. At step 360, a voice volley of PTT communications occurs between the PTT device 100 and the contact's wireless communication device. To talk, the user presses and holds the talk button 210 while talking to initiate and send a voice communication message. To listen, the user simply releases the talk button 210, and listens to the incoming voice communication message. The user repeats this pressing/holding and releasing of the talk button 210 to talk and listen during a conversation. The call automatically ends after a 10-20 second idle period. Thus, if either party stops responding for a 10-20 second period, the call ends itself.

During an active call session, an indicator light (e.g., LED) 362 stays lit continuously, regardless of who initiated a call, to indicate an active call session. When the call ends or if the PTT device 100 is on and there is no active call session, the indicator light 362 will blink at regular intervals to let the user know that the PTT device 100 is on. In an alternative embodiment, the indicator light 362 may change colors (e.g., green) to indicate the PTT device 100 is on and is in digital service mode, and (e.g., red) to indicate the PTT device 100 is on but can not connect to service.

Figure 3:
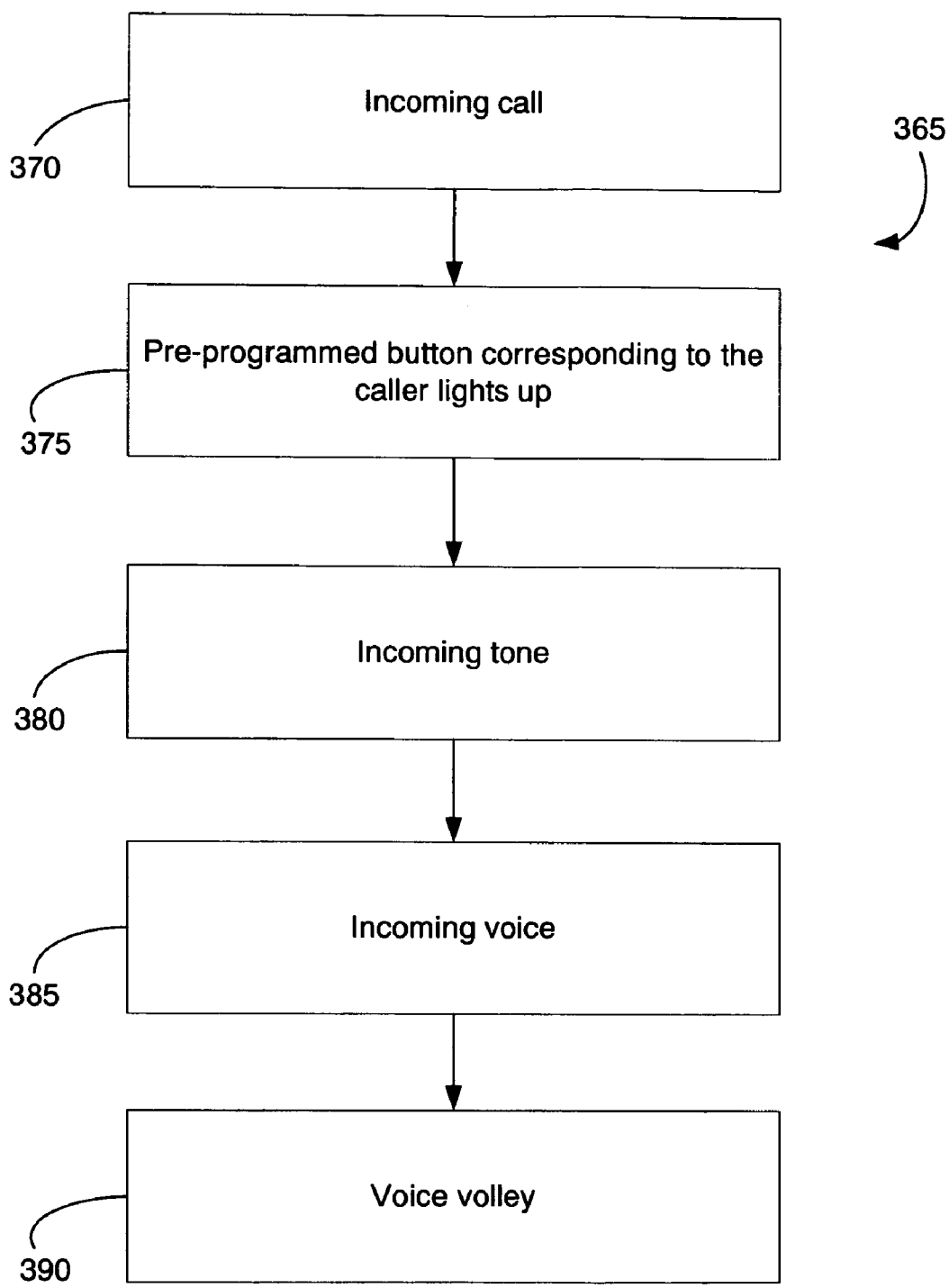
FIG. 3 is a flowchart of an exemplary method of receiving a call with the wireless communication device illustrated in FIG. 1A.

With reference to FIG. 3, a method 365 for receiving a PTT call from a pre-programmed contact with the PTT device 100 will now be described. At step 370, the PTT device 100 receives an incoming call from a contact's wireless communication device. The contact is one of a select number of contacts that the PTT device 100 is pre-programmed for. The hardware/software in the PTT device 100 matches up the contact's caller information with the LED(S) corresponding to the icon of the contact. At step 375, the LED(s), and, hence, the icon, corresponding to the caller lights up, indicating to the user who is calling. The LED(s) may flash or otherwise illuminate behind the contact's icon to alert the user of the identify of the caller. In addition to illumination of the corresponding PTT button 160, at step 380, the PTT device 100 may alert the user of the call with an incoming tone (and/or vibration of the PTT device 100). The user may accept the call in a number of ways. For example, the user is able to accept the call by pressing the PTT button 160 and/or the talk button 210. In another embodiment, the user may accept the call by pressing the button associated with the contact. At step 385, the incoming voice of the contact is heard from the speaker 200. At step 390, a voice volley of PTT communications occurs between the PTT device 100 and the contact in the manner described above.

Figure 4A:
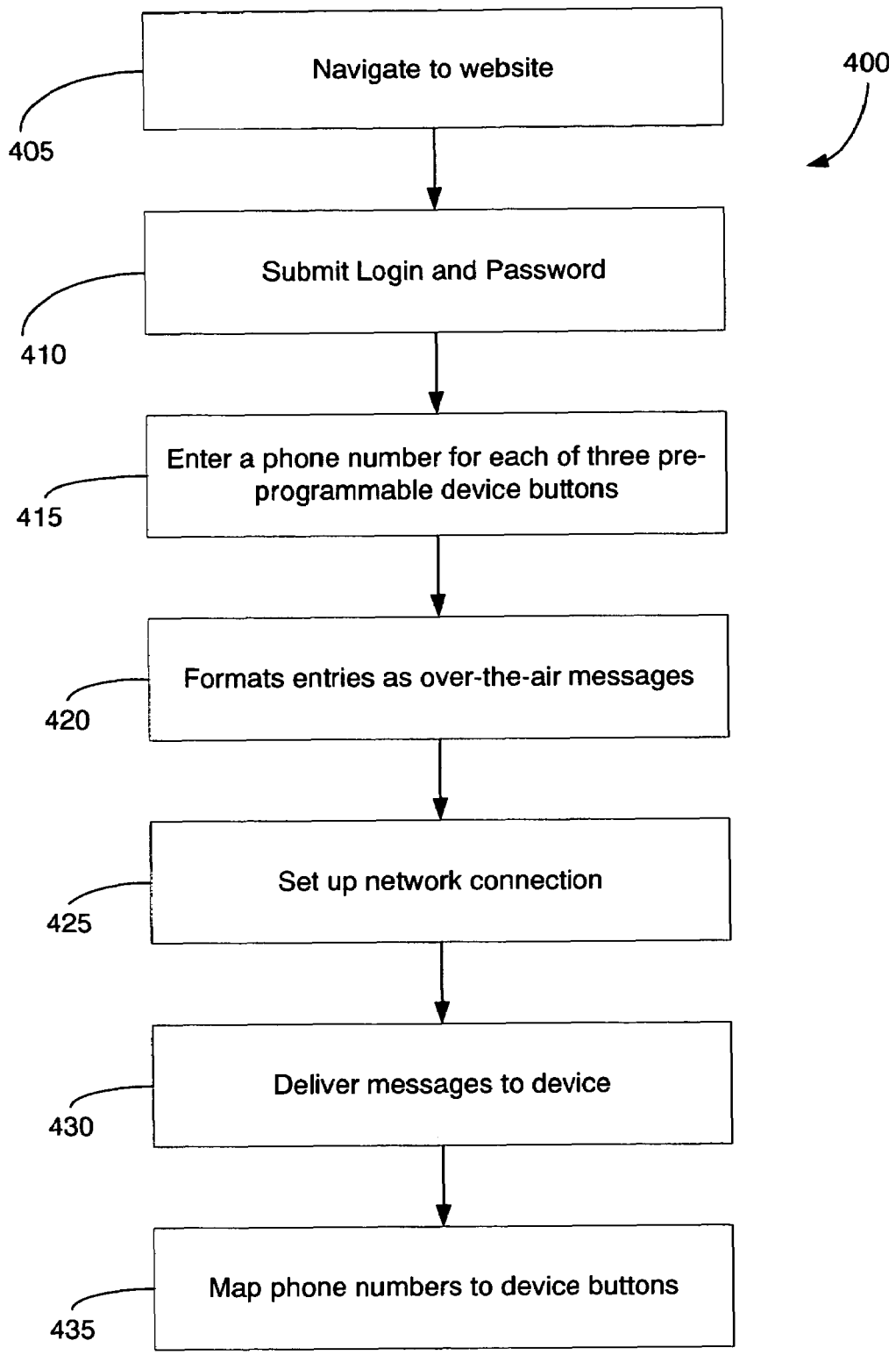
FIG. 4A is a flowchart of an exemplary method of pre-programming each button of the wireless communication device illustrated in FIG. 1A.

With reference to FIG. 4A, a method 400 of pre-programming or re-programming each PTT button 160 of the PTT device 100 will now be described. At step 405, a user navigates via the Internet to a website that, among other things, may be used to pre-program each PTT button 160 of the PTT device 100. Once at the website, at step 410, a user submits a login and password to gain access to the restricted application (s) of the website. A user then accesses a web page, which prompts the user to enter a phone number for each of the three pre-programmable PTT buttons 160. At step 415, a user enters phone numbers for the respective pre-programmable PTT buttons 160. At step 420, the phone number entries and related information are formatted as over-the-air messages. At step 425, a wireless communication network connection is established, and at step 430, the over-the-air messages are delivered to the PTT device 100. At step 435, the phone numbers in the over-the-air messages are mapped to the respective PTT buttons 160 and LED(s), programming the PTT buttons 160 and LED(s).

The pre-programming method 400 may be performed by the user of the PTT device 100, a guardian, a manager of a group, a wireless store employee, or other person. In alternative embodiments, the pre-programming of each pre-programmed PTT button 160 may be performed with the PTT device 160 or through a computer (and browser) directly connected to the PTT device 100.

Figure 4B:
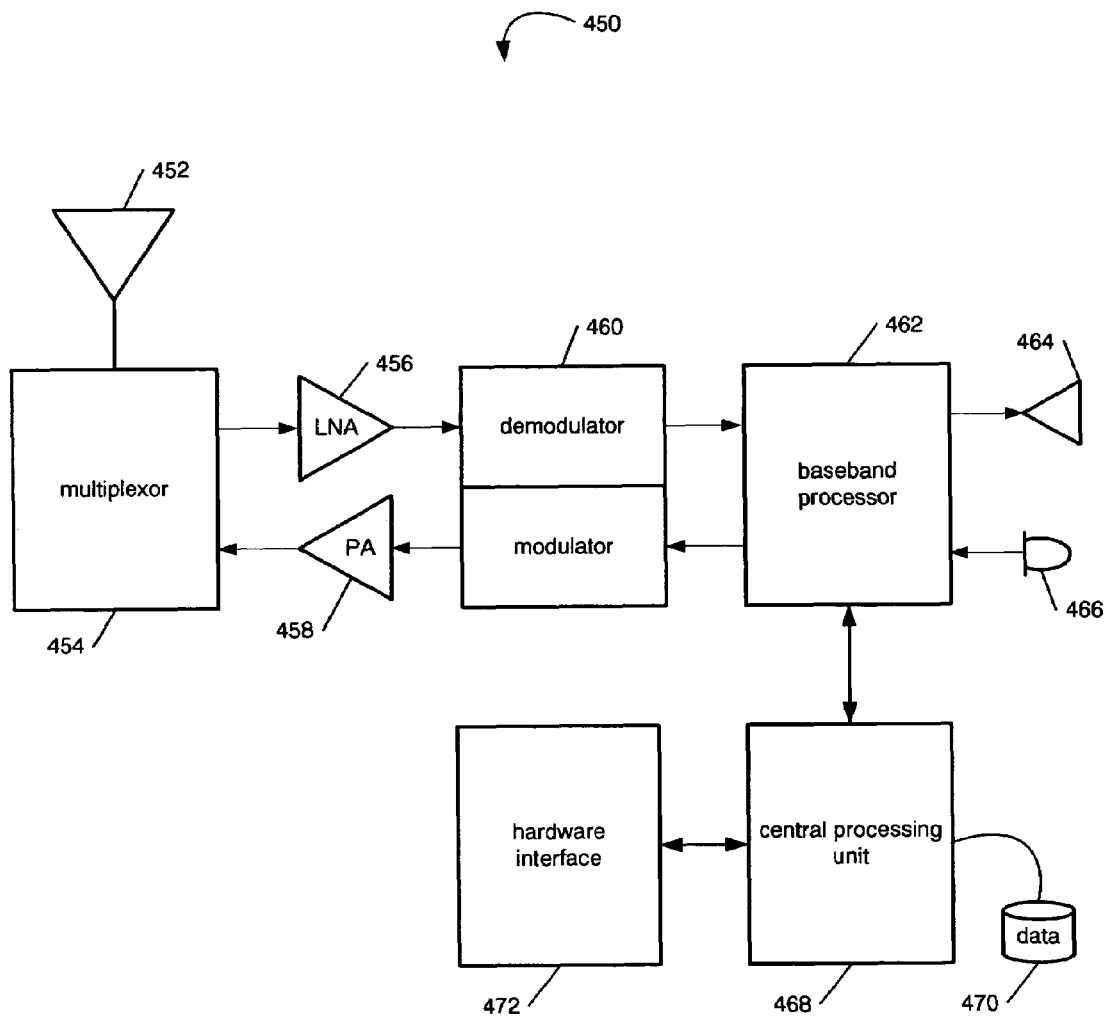
FIG. 4B is a block diagram illustrating an exemplary wireless communication device that may be used in connection with the various embodiments described herein.

FIG. 4B is a block diagram illustrating an exemplary wireless communication device 450 that may be used in connection with the various embodiments described herein. For example, the wireless communication device 450 may be used as the PTT device 100, 500, 700, 900 in conjunction with placing and receiving PTT calls, pre-programming of PTT buttons and LED(s) of the PTT device 100, 500, 700, 900 as discussed herein, and locating the PTT device 100, 500, 700, 900. The exemplary wireless communication device 450 may be used as the push-to-locate device 1020 described below with respect to FIG. 8B. However, other wireless communication devices and/or architectures may also be used, as will be clear to those skilled in the art having the benefit of this disclosure.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 5A:
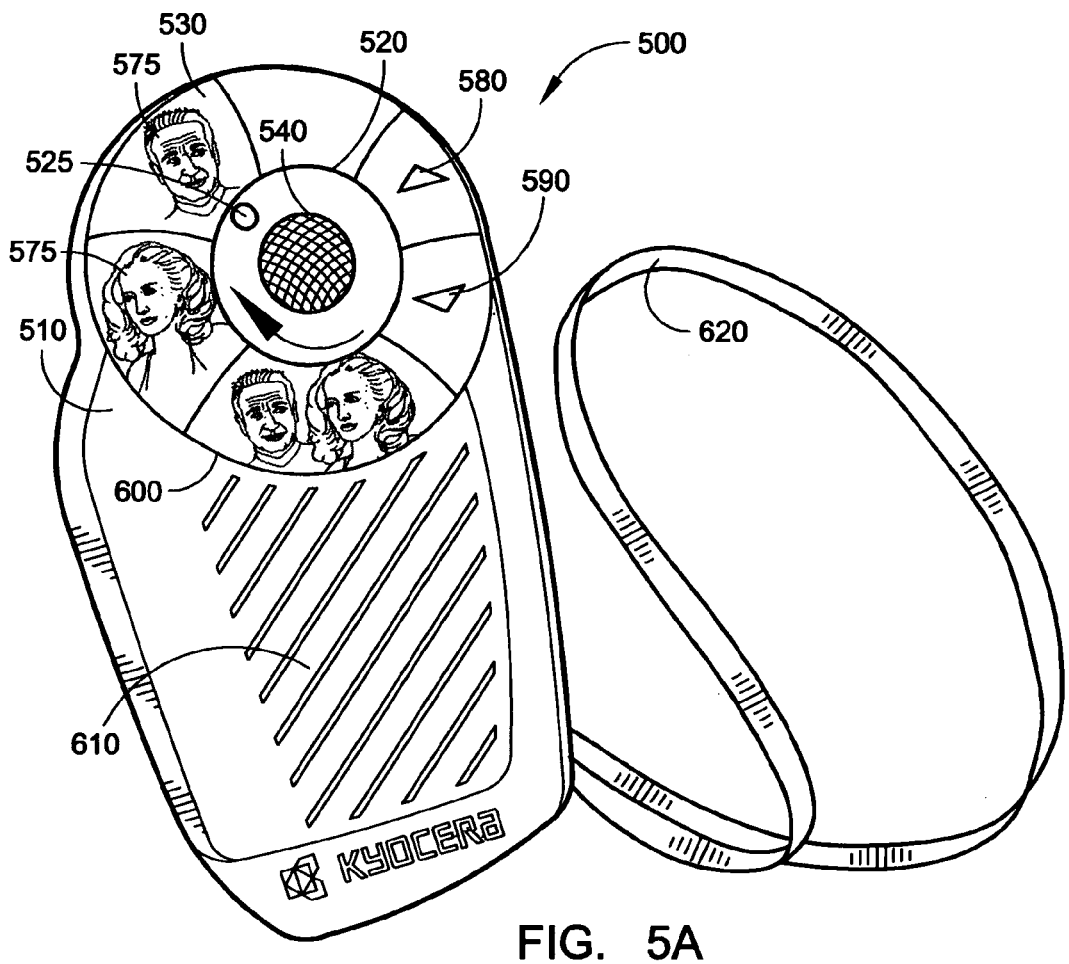
FIG. 5A is a front perspective view of a further embodiment of a wireless communication device.
Figure 5B:
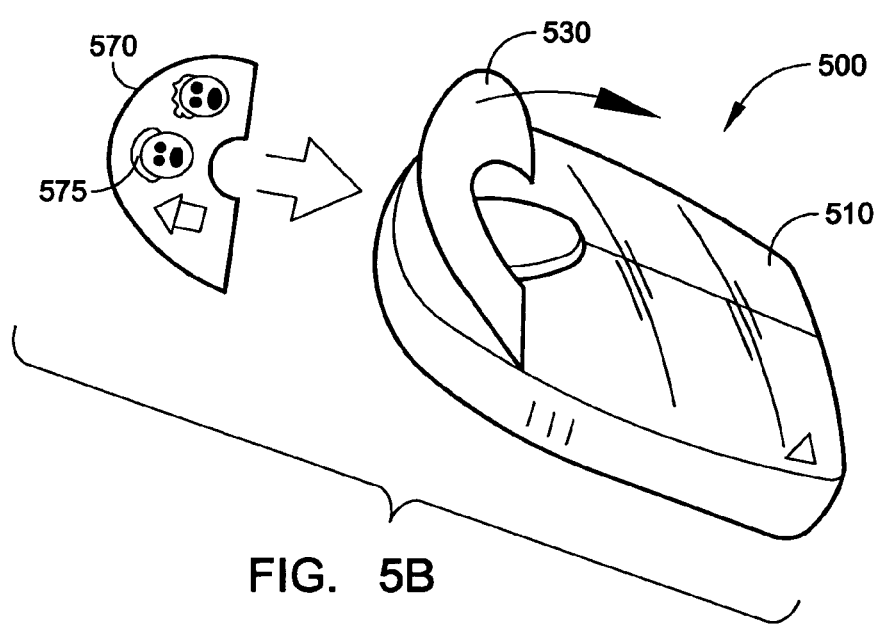
FIG. 5B is another front perspective view of the wireless communication device illustrated in FIG. 5A and illustrates how graphics may be added to the pre-programmed keys or sections of the wireless communication device.

With reference to FIGS. 5A and 5B, a further embodiment of a PTT device 500 will be described. The PTT device 500 includes a housing 510 with a rotatable wheel 520 and indicator 525. An arc-shaped window 530 is pivotally attached to the housing 510, around microphone 540, for adding and removing replaceable graphics 570. The graphics 570 have an arc-shaped configuration, and may be replaceable, as discussed above with respect to FIGS. 1A-1D. The graphics 570 may come in "sticker" form (e.g., single-sided sticker, double-sided sticker). The arch-shaped window 530 forms half of a circle extending around rotatable wheel 520. The other half of the circle includes volume buttons 580, 590 and a PTT "talk" button 600. The PTT device 500 includes a speaker 610 and an attachment strap or lanyard 620.

To place a PTT call to a desired contact, the user rotates/twists the wheel 525 with one's thumb so that the indicator 525 points to the icon 575 representative of the desired contact, and presses the PTT "talk" button 600. Once the call is placed, to talk to the contact, the user holds the PTT "talk" button 600 while talking. When finished talking, the user releases the PTT "talk" button 600. To receive a PTT call, one or more LED(s) corresponding to the caller's icon 575 is illuminated when a call is received. This illuminates the caller's icon 575, identifying the caller to the user. The user then presses the PTT "talk" button 600 to take the call. In addition to illumination of the caller's icon 575, the PTT device 500 may include one or more alarms (e.g., vibration mechanism, ringer) to alert the user of an incoming call.

Figure 6:
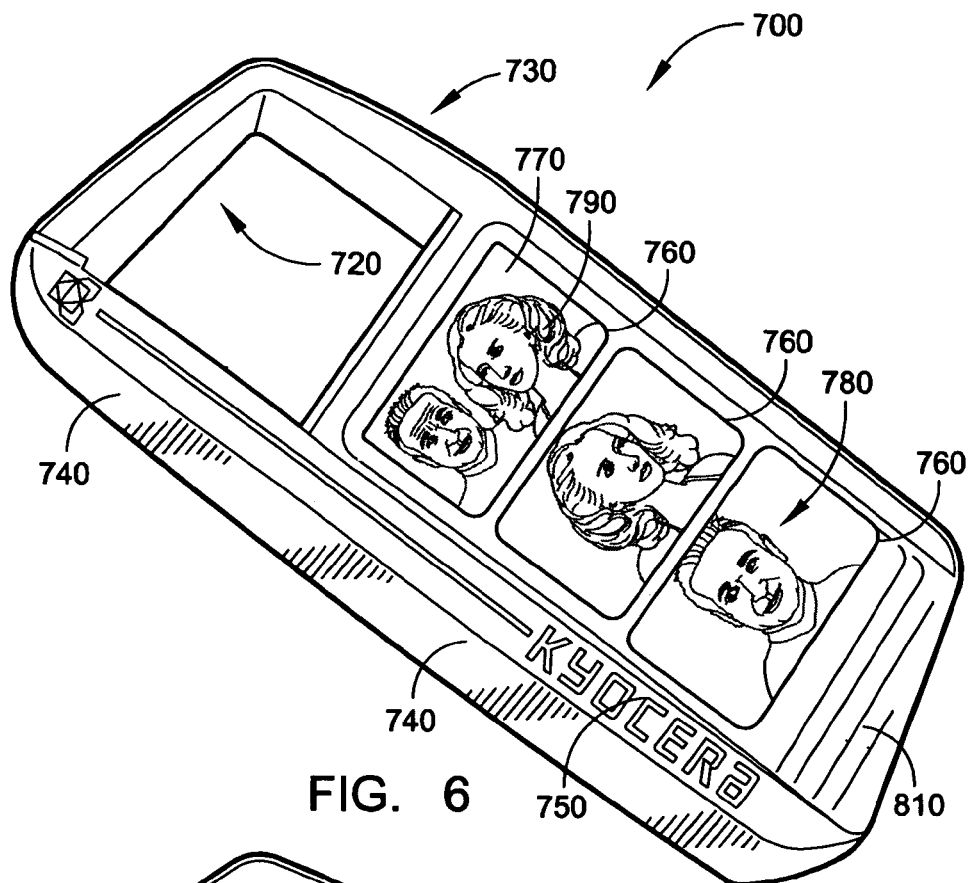
FIG. 6 is a front perspective view of a still further embodiment of a wireless communication device.

With reference to FIG. 6, a still further embodiment of a PTT device 700 will be described. The PTT device 700 includes a housing with a carabiner clip 720 at a top 730 of the housing. The carabiner clip 720 is pivotally attached to an extension 740 for clipping the PTT device 700 to an object (e.g., belt loop, purse loop, etc.). A front 750 of the PTT device 700 includes three PTT buttons 760, although other numbers of PTT buttons 760 may be provided in alternative embodiments. Each PTT button 760 includes a window 770 with removable graphics 780 thereunder. In the embodiment shown, the graphics 780 includes an icon 790 of the contact corresponding to the PTT button 760. In an alternative embodiment, the PTT buttons 760 may be disposed adjacent to respective icons 790, as illustrated in FIG. 1A. Graphics slots (not shown) adjacent the window 770 allow the graphics 780 to be inserted thereinto or removed therefrom, beneath the window 770, for changing/adding icons 790 for each PTT button 760, as discussed above with respect to FIGS. 1A-1D. LED(s) may be disposed beneath or within the PTT buttons 760 so that the icon 790 of a PTT button 760 illuminates upon an incoming call to identify to the user who the caller is. The PTT device 700 may include an integrated light source (not shown) so that the PTT device 700 may be used as a flashlight. The front 750 includes a speaker 810. The PTT device 700 may also include volume buttons (now shown) for adjusting the volume on the PTT device 700.

To place a PTT call to a desired contact, the user presses the PTT button 760 with the icon 790 of the contact the user desires to call. Once the call is placed, the user may hold the PTT button 760 to talk. Alternatively, the PTT device 700 may include a PTT "talk" button that the user presses while talking. To receive a PTT call, the PTT button 760 (and icon 790) corresponding to the caller is illuminated upon receipt of a call. This identifies the caller to the user. The user then presses the PTT button 760 to take the call. In addition to illumination of the PTT button 760 (and icon 790) corresponding to the caller, the PTT device 760 may include one or more alarms (e.g., vibration mechanism, ringer) to alert the user of an incoming call.

Figure 7:
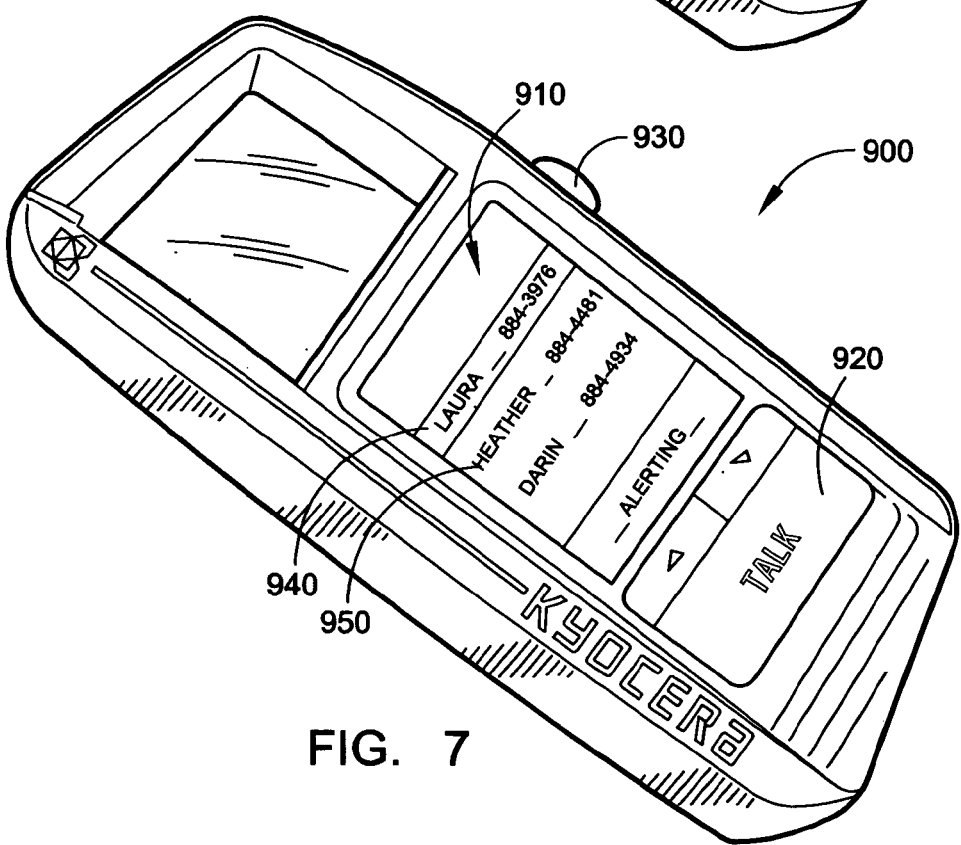
FIG. 7 is a front perspective view of an additional embodiment of a wireless communication device.

With reference to FIG. 7, another embodiment of a PTT device 900 is shown. The PTT device 900 is similar to the PTT device 700 described above with respect to FIG. 3, except instead of the PTT buttons 760, the PTT device 900 includes a multi-line display 910, a PTT "talk" button 920, and a rotatable scroll wheel 930.

To place a PTT call to a desired contact, the user scrolls through a list of contacts displayed on the multi-line display 910 by rotating the scroll wheel 930. Rotation of the scroll wheel 930 causes a highlight bar 940 to move over displayed contacts 950. When the highlight bar 940 is over a contact 950 the user wants to call, the PTT "talk" button 920 is selected, and a call to this contact is made. Once the call is placed, the user holds the PTT "talk" button 920 to talk. To receive a PTT call, the contact info for the caller is displayed in the multi-line display 910 upon receipt of the call. This contact 950 may be highlighted with, for example, but not by way of limitation, a solid highlight bar 940, a flashing highlight bar 940, or through a different alert. This identifies the caller to the user. The user then presses this PTT "talk" button 920 to take the call. In addition to displaying the caller contact info, the PTT device 900 may include one or more alarms (e.g., vibration mechanism, ringer) to alert the user of an incoming call.

The PTT device 900 is ideal for use in a business setting where employees only need to contact a select number of other employees (e.g., warehouse, shipping, etc.) of the company because the PTT device 900 can be programmed by the manager/IT group in the manner described above with respect to FIG. 4A to support only business needs. This prevents an employee with the PTT device 90 from contacting individuals outside this group (e.g., calling girlfriend, boyfriend, etc.) for non-business purposes.

The PTT devices 100, 500, 700 and methods described above eliminate the need for a display (e.g., LCD display) and a keypad (e.g., phone keypad) in a wireless communication device, simplifying and reducing the cost of wireless communication devices. The PTT devices 100, 500, 700, method of placing a call 330, and method of receiving a call 365 greatly simplify the placing and receiving of wireless communications to and from a limited number of personal contacts (e.g., mom, dad), allowing the PTT wireless communication device to be used by users of all age groups, and, in particular, by users that previously did not use PTT wireless communication devices or services (e.g., children that are 7-12 years old and adults 70+ years old).

With reference to FIGS. 1 and 8A-8C, an exemplary push-to-locate ("PTL") communication device 1020 (FIG. 8B) and method 1050 (FIG. 8C) for locating the target PTT wireless communication device 100, 500, 700 will be described. With the PTL communication device 1020 and method 1050, a loved one or guardian (e.g., mom) calls a PTL service (e.g., assisted GPS service by a carrier) using the locating PTL communication device to get the geographical location of the target PTT wireless communication device 100 (e.g., location of child). This method 1050 provides personal security functionality through the ability to geographically locate the person by tracking the PTT device 100, and the ability to locate the actual device 100 if the device 100 is lost.

Figure 8A:
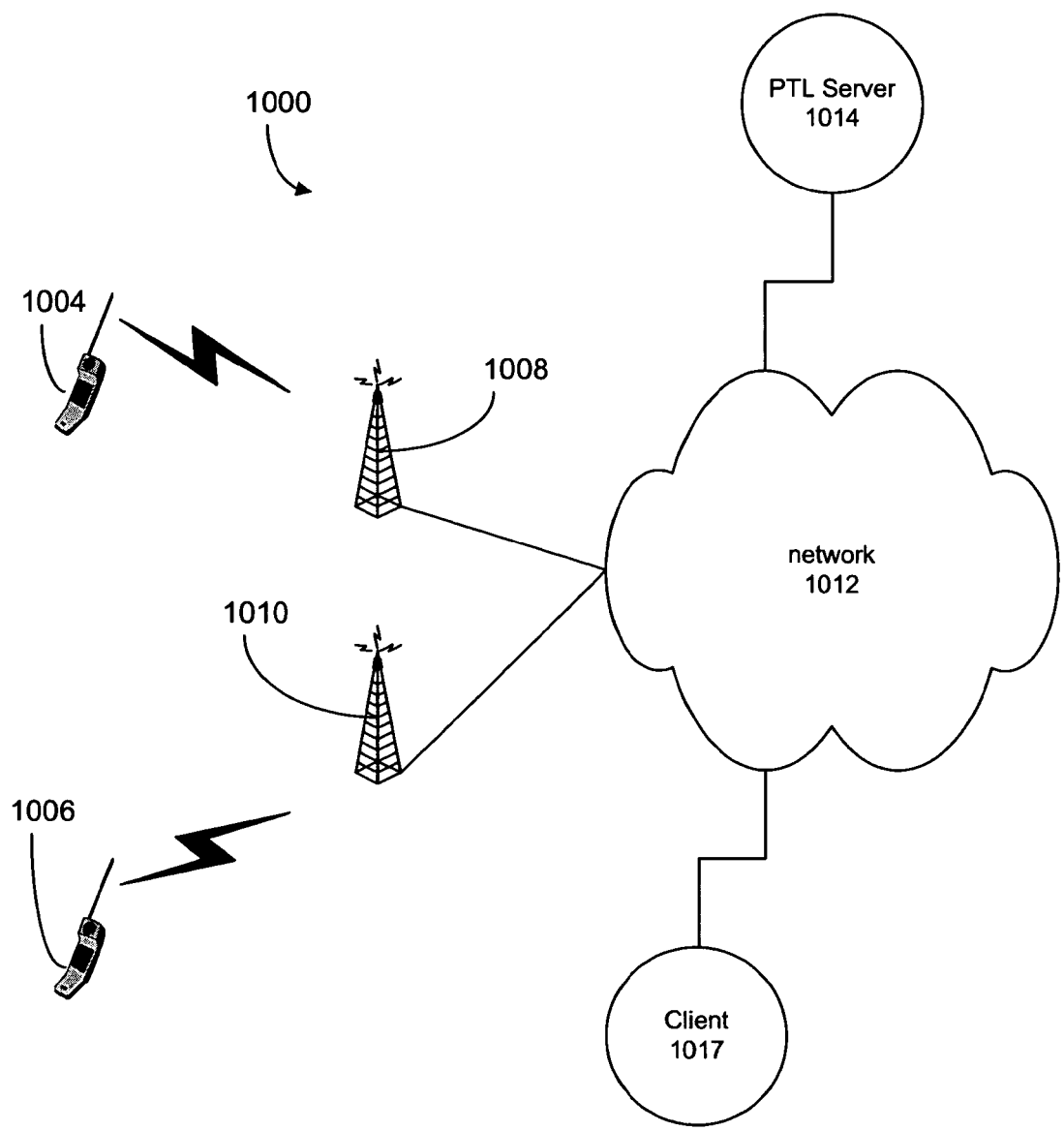
FIG. 8A is a high level block diagram illustrating an example wireless communication network.

FIG. 8A is a high level block diagram illustrating an example wireless communication network 1000. In the illustrated embodiment, the wireless communication network 1000 includes a plurality of wireless communication devices 1004, 1006 communicatively coupled with a network 1012 via a plurality of base stations 1008 and 1010. Additional wireless communication devices and base stations can also be employed as part of the wireless communication network 1000. The wireless communication network 1000 also comprises a PTL server 1014. The plurality of wireless communication devices 1004, 1006 are communicatively coupled with the PTL server 1014 via the base stations 1008 and 1010 and the network 1012.

Wireless communication devices 1004, 1006 can be any sort of devices with the ability to communicate within the wireless communication network 1000 and execute software modules. Preferably, wireless communication devices 1004, 1006 also have a persistent storage area. For example, but not by way of limitation, the wireless communication devices 1004, 1006 may be a PTT wireless communication device 100, 500, 700, a PTL communication device 1020, a cell phone, a personal digital assistant ("PDA"), a laptop computer, wristwatch, or any other device configured for wireless communication. Wireless communication devices 1004, 1006 may also be referred to herein as "handsets" or "mobile phones" or "mobile devices."

Base station 1008 is preferably configured to communicate over-the-air with a plurality of wireless communication devices and includes a transceiver (not shown) that converts the over-the-air communications to wired communications that travel over network 1012. Preferably, network 1012 is a private network operated by a wireless carrier. Network 1012 preferably provides the infrastructure for handoffs between base stations such as base station 1008 and 1010. Additionally, network 1012 preferably provides the communication link between various applications, services, and other computer based servers such as PTL server 1014.

Network 1012 may also serve as the conduit for connections to other networks (not pictured) such as an Integrated Services Digital Network ("ISDN"), Public Switched Telephone Network ("PSTN"), Public Land Mobile Network ("PLMN"), Packet Switched Public Data Network ("PSPDN"), and the Internet, just to name a few.

One or more client computers 1017 and one or PTL servers 1014 are connected to the network 1012. The features of a general purpose computer that may implement the client computer functions described herein and the PTL server-side functions described herein are later described with respect to FIG. 11.

Figure 8B:
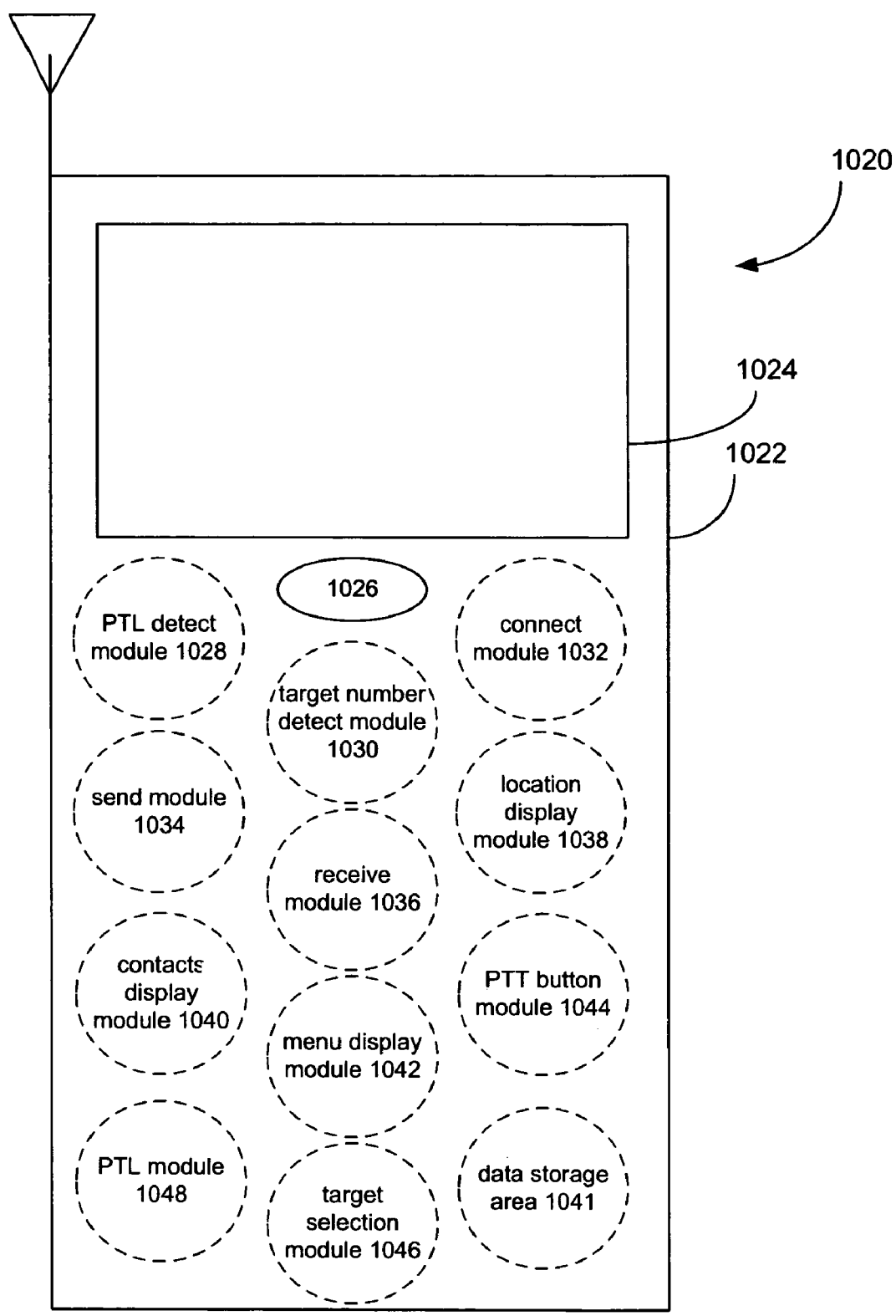
FIG. 8B is a block diagram illustrating components of an example wireless communication device.

FIG. 8B is a block diagram illustrating components of an embodiment of the PTL communication device 1020. The general features of PTL communication device 1020 that allow it to function as such are described above with respect to FIG. 4B. In the illustrated embodiment, the PTL communication device 1020 includes a housing 1022, a display 1024, a PTL activation mechanism 1026, a PTL detect module 1028, target number detect module 1030, a connect module 1032, a send module 1034, a receive module 1036, a location display module 1038, a contacts display module 1040, a menu display module 1042, a PTT button module 1044, a target selection module 1046, a PTL module 1048, and a data storage area 1041. The PTL detect module 1028 detects selection of push-to-locate ("PTL") activation mechanism 1026. The target number detect module 1030 detects selection of a target number corresponding to the second wireless, display-less, keypad-less communication device. The connect module 1032 establishes a connection with carrier network 1000. The send module 1034 sends a push-to-locate request for the target number to the carrier network to obtain a geographical location of the PTL communication device 100, 500, 700 using a location-based service. The receive module 1036 receives the geographical location of the PTL communication device 100, 500, 700. The location display module 1038 displays the geographical location of the PTL communication device 100, 500, 700 with the display 1024. The contacts display module 1040 provides a displayed list of contact names and numbers. The menu display module 1042 displays a list of menu options including a push-to-locate menu option. The PTT button module 1044 detect actuation of a push-to-talk button of the PTL activation mechanism 1026. The target selection module 1046 detects selection of a target name and number corresponding to the PTL communication device 100, 500, 700 from the displayed list of contact names and numbers. The PTL module 1048 detects selection of a push-to-locate menu option of the displayed list of menu options. Data storage 1040 is integrated into device 1020, and can also be a removable storage device or an external storage device.

Figure 8C:
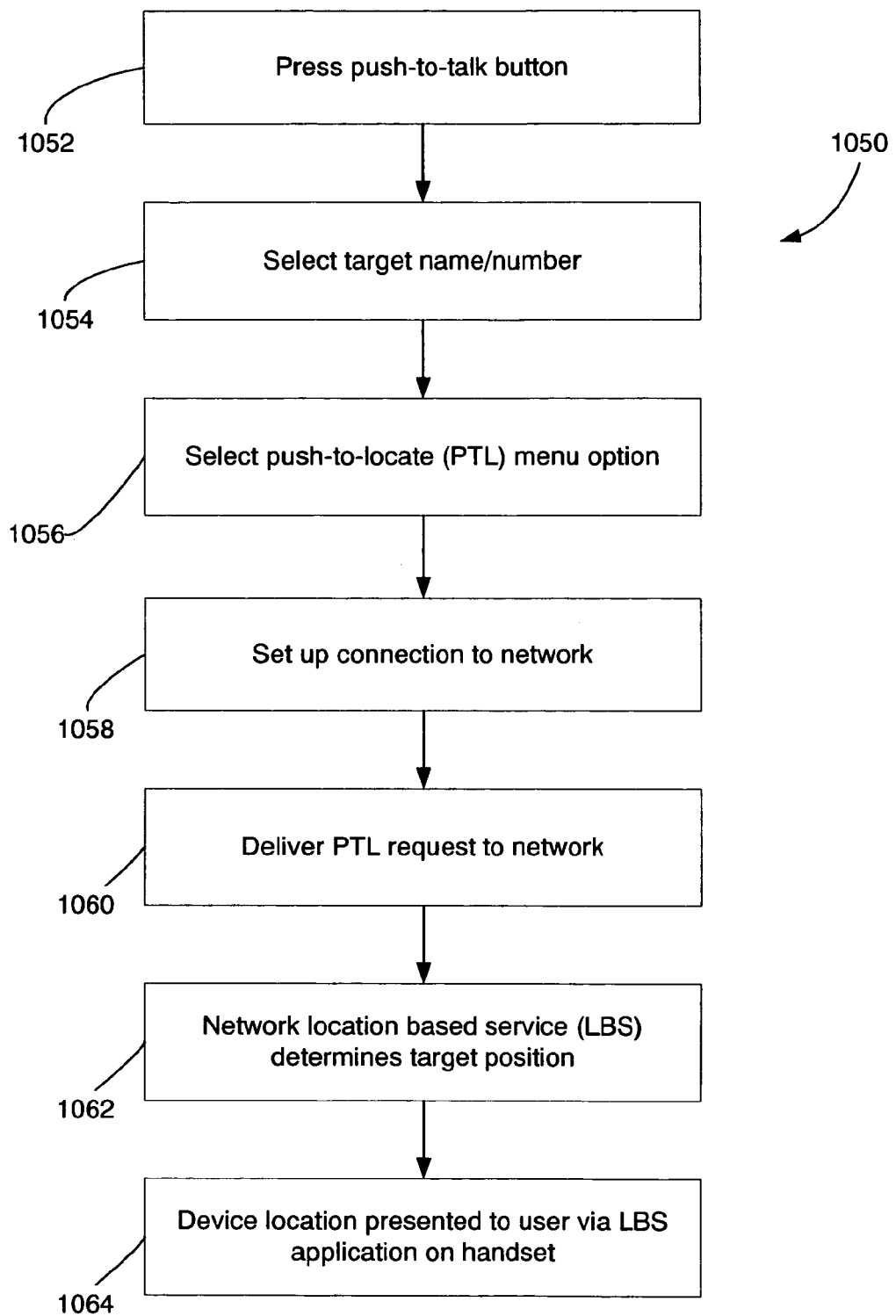
FIG. 8C is a flowchart of an exemplary method for locating a wireless communication device using a push-to-locate ("PTL") wireless communication device and method.

With reference to FIG. 8C, an exemplary PTL method 1050 will now be described. For example purposes, the method 1050 will be described in conjunction with an example scenario where a mother can not find her child after school. After the mother realizes her child is missing, she activates the PTL activation mechanism 1026. In the embodiment of the PTL device 1020 shown in FIG. 8B, this includes, at step 1052, pressing the push-to-talk button on the PTT wireless communication device 1020. This will bring up a list of target names/numbers on her PTT wireless communication device 1020. At step 1054, the target name/number corresponding to her child is selected. Then, at step 1056, the PTL menu option is selected on the PTT wireless communication device 1020. Display and selection of the target name/number and the PTL menu option is enabled through a location-based service (LBS) application on the mother's PTT wireless communication device 1020. This causes, at step 1058, a connection to the service carrier network 1000, and at step 1060, a PTL request to be delivered to the service carrier network 1000. At step 1062, a network LBS provided by the service carrier determines the target position of the child by tracking the PTT device 100. In the embodiment shown, the network LBS is an assisted GPS service where the PTT device 100 is located using the GPS receiver in the PTT device 100. The GPS service provided by the carrier locates the child's PTT device 100. The location of the PTT device 100, which typically corresponds to the location of the child, is communicated to the mother's PTT wireless communication device through the service carrier network and, at step 1064, the location of the PTT device 100 is presented to the mother on her PTT wireless communication device 1020 using the LBS application on the PTT wireless communication device 1020. A GPS-to-street address or other translation service may be performed prior to presentation of the location on the mother's PTT device. The mother then knows where to find the child.

Figure 9:
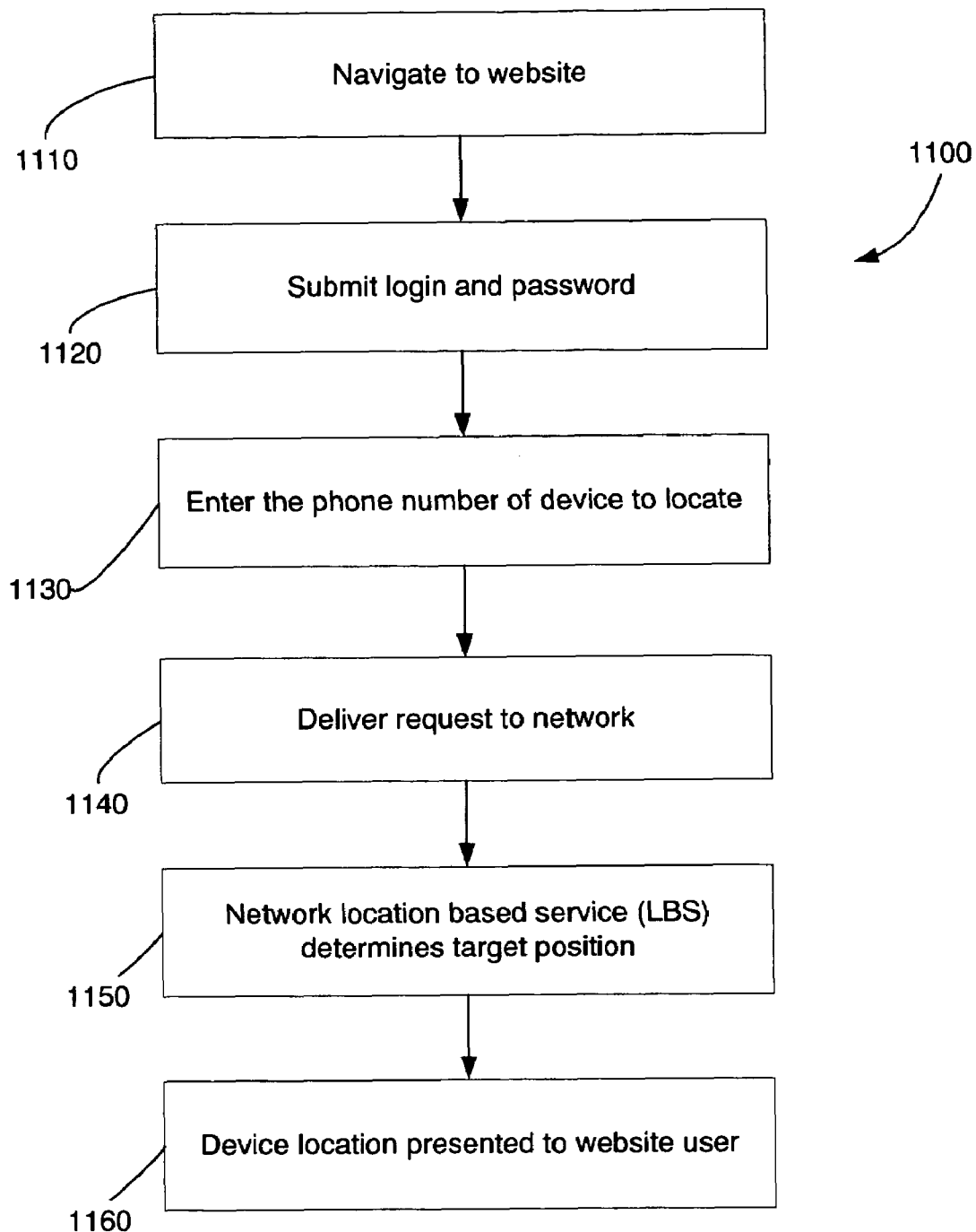
FIG. 9 is a flowchart of another exemplary method for locating a wireless communication device using a push-to-locate (PTL) wireless communication device and method.

With reference to FIG. 9, another exemplary method 1100 for locating the PTT wireless communication device 100 using a push-to-locate (PTL) service will now be described. Using the same scenario as above, after a mother realizes her child is missing, at step 1110, she navigates to a PTL website (or service carrier website) of the service carrier using a computer connected to the Internet. At step 1120, a login ID and password are provided. The mother is then prompted to enter the phone number of the PTT device 100 to be located. The phone number is submitted, and, at step 1140, a location request is delivered to the service carrier network. At step 1150, a network LBS provided by the service carrier determines the target position of the child by tracking the PTT device 100. At step 1160, the location of the PTT device 100 is presented to the mother via her computer's web browser. A GPS-to-street address or other translation service may be performed prior to presentation of the location on the mother's PTT device. The mother then knows where to find the child.

Figure 10:
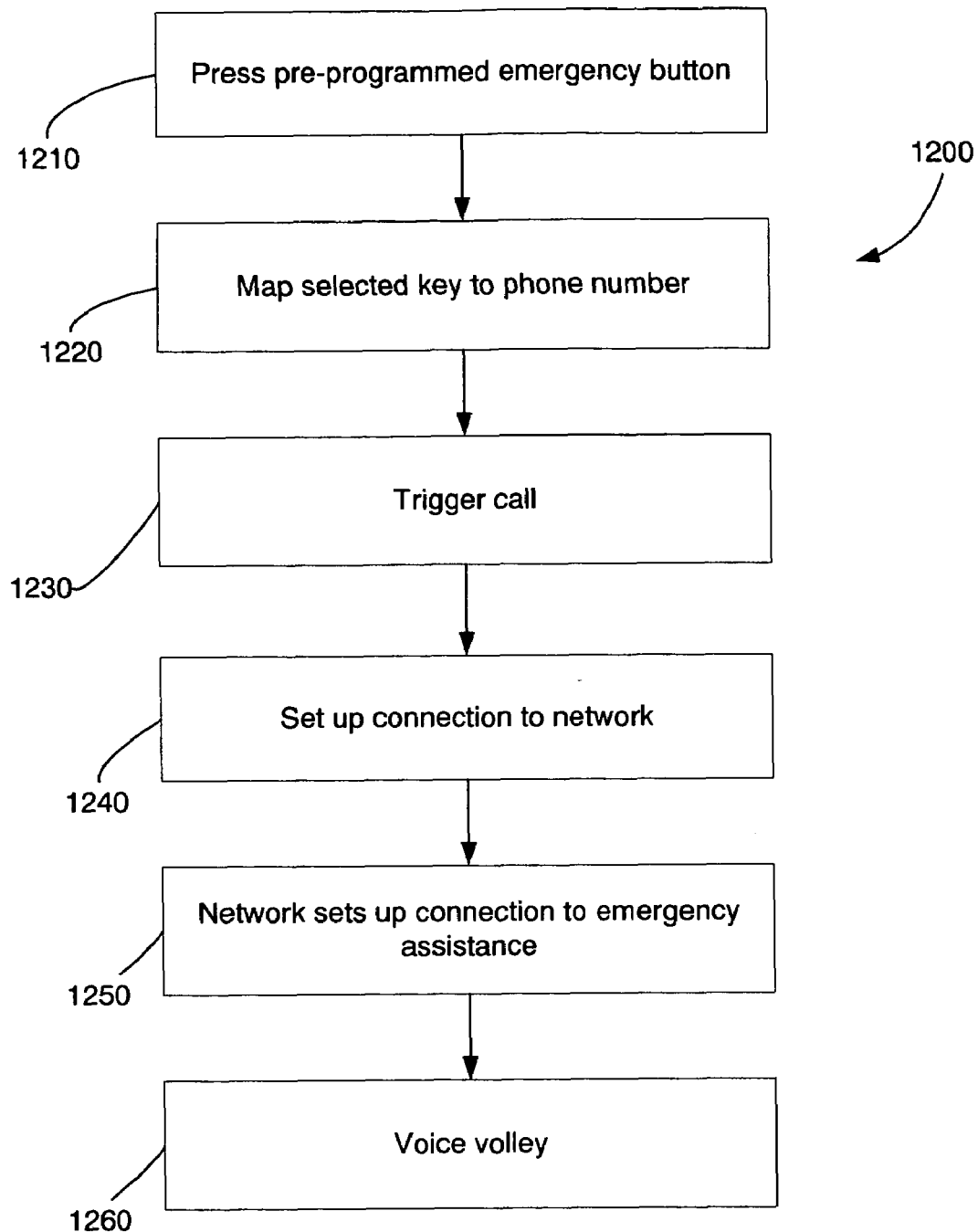
FIG. 10 is a flowchart of an exemplary method for obtaining emergency assistance using a wireless communication device.

With reference to FIGS. 1B and 10, an exemplary method 1200 for obtaining emergency assistance using the PTT wireless communication device 100 will now be described. To place an emergency call, the cap 310 on the rear 130 of the PTT device 100 is removed and, at step 1210, the emergency button 300 is pushed by the user. This causes, at step 1220, the selected emergency button to map to an emergency phone number (e.g., 911). At step 1230, a call is triggered by the PTT device 100. At step 1240, a connection to the carrier network is set up. At step 1250, a connection to emergency assistance (e.g., 911) is set up by the network, and, at step 1260, a voice volley between the user of the PTT device 100 and emergency assistance occurs.

Figure 11:
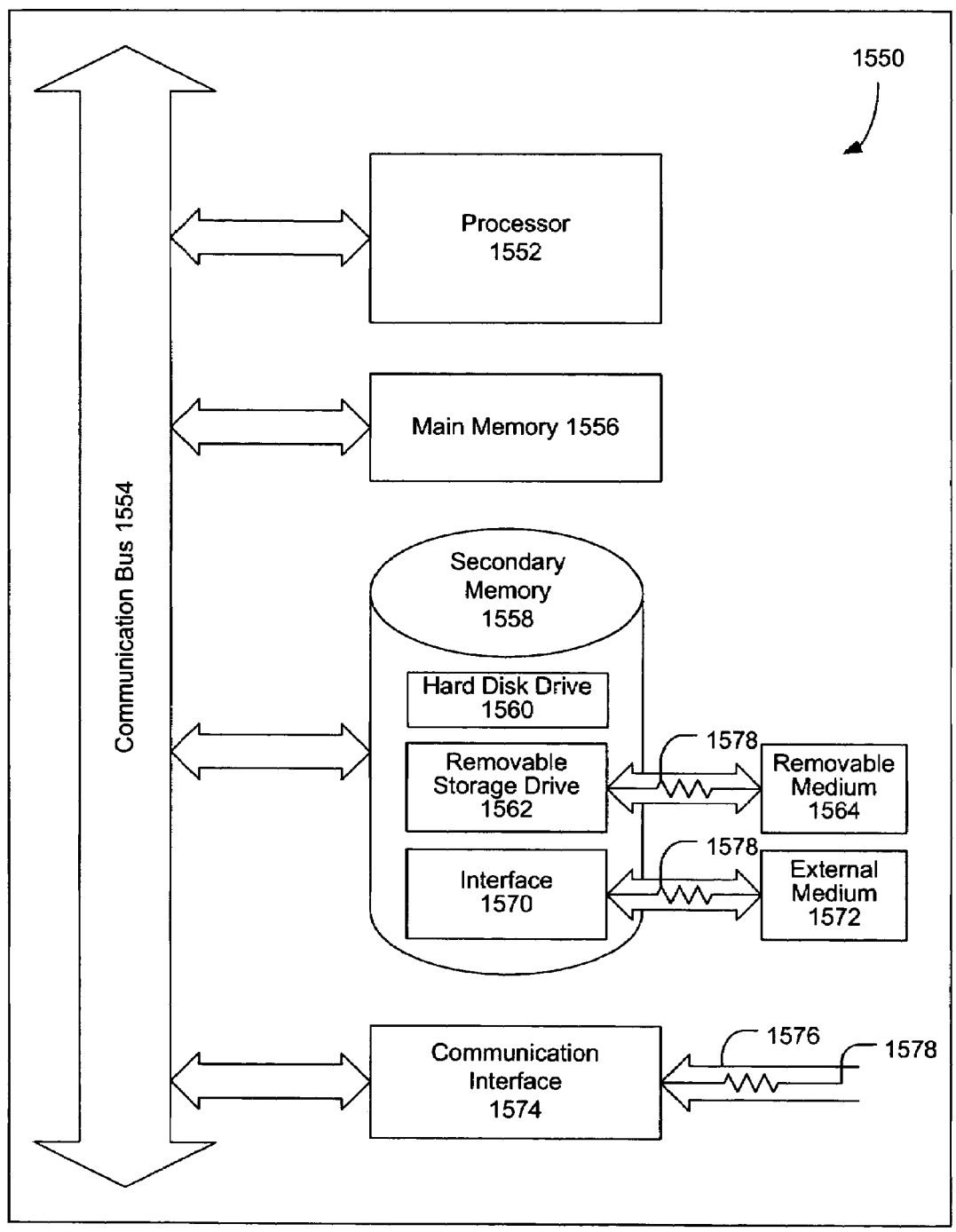
FIG. 11 is a block diagram illustrating an exemplary computer system as may be used in connection with various embodiments described herein.

FIG. 11 is a block diagram illustrating an exemplary computer system 1550 that may be used in connection with the various embodiments described herein. For example, the computer system 1550 may be used in conjunction with the software module server 1014. However, other computer systems and/or architectures may be used, as will be clear to those skilled in the art having the benefit of this disclosure.

The computer system 1550 preferably includes one or more processors, such as processor 1552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1552.

The processor 1552 is preferably connected to a communication bus 1554. The communication bus 1554 may include a data channel for facilitating information transfer between storage and other peripheral components of the computer system 1550. The communication bus 1554 further may provide a set of signals used for communication with the processor 1552, including a data bus, address bus, and control bus (not shown). The communication bus 1554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 1550 preferably includes a main memory 1556 and may also include a secondary memory 1558. The main memory 1556 provides storage of instructions and data for programs executing on the processor 1552. The main memory 1556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1558 may optionally include a hard disk drive 1560 and/or a removable storage drive 1562, for example a floppy disk drive, a magnetic tape drive, a compact disc ("CD") drive, a digital versatile disc ("DVD") drive, etc. The removable storage drive 1562 reads from and/or writes to a removable storage medium 1564. Removable storage medium 1564 may be, for example, a floppy disk, magnetic tape, CD, DVD, etc.

The removable storage medium 1564 is preferably a computer readable medium having stored thereon computer executable code (i.e., software) and/or data. The computer software or data stored on the removable storage medium 1564 is read into the computer system 1550 as electrical communication signals 1578.

In alternative embodiments, secondary memory 1558 may include other similar means for allowing computer programs or other data or instructions to be loaded into the computer system 1550. Such means may include, for example, an external storage medium 1572 and an interface 1570. Examples of external storage medium 1572 may include an external hard disk drive or an external optical drive, or and external magneto-optical drive.

Other examples of secondary memory 1558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 1572 and interfaces 1570, which allow software and data to be transferred from the removable storage unit 1572 to the computer system 1550.

Computer system 1550 may also include a communication interface 1574. The communication interface 1574 allows software and data to be transferred between computer system 1550 and external devices (e.g. printers), networks, or information sources. For example, computer software or executable code may be transferred to computer system 1550 from a network server via communication interface 1574. Examples of communication interface 1574 include a modem, a network interface card ("NIC"), a communications port, a PCMCIA slot and card, an infrared interface, and an IEEE 1394 fire-wire, just to name a few.

Communication interface 1574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 1574 are generally in the form of electrical communication signals 1578. These signals 1578 are preferably provided to communication interface 1574 via a communication channel 1576. Communication channel 1576 carries signals 1578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 1556 and/or the secondary memory 1558. Computer programs can also be received via communication interface 1574 and stored in the main memory 1556 and/or the secondary memory 1558. Such computer programs, when executed, enable the computer system 1550 to perform the various functions of the present invention as previously described.

In this description, the term "computer readable medium" is used to refer to any media used to provide computer executable code (e.g., software and computer programs) to the computer system 1550. Examples of these media include main memory 1556, secondary memory 1558 (including hard disk drive 1560, removable storage medium 1564, and external storage medium 1572), and any peripheral device communicatively coupled with communication interface 1574 (including a network information server or other network device). These computer readable mediums are means for providing executable code, programming instructions, and software to the computer system 1550.

In an embodiment that is implemented using software, the software may be stored on a computer readable medium and loaded into computer system 1550 by way of removable storage drive 1562, interface 1570, or communication interface 1574. In such an embodiment, the software is loaded into the computer system 1550 in the form of electrical communication signals 1578. The software, when executed by the processor 1552, preferably causes the processor 1552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Those of skill in the art having the benefit of this disclosure will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art having the benefit of this disclosure to make or use the invention. Various modifications to these embodiments will be readily apparent to those skilled in the art having the benefit of this disclosure, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art having the benefit of this disclosure and that the scope of the present invention is accordingly limited by nothing other than the appended claims.

What is claimed is:

1. A wireless communication system, comprising:
   a first wireless, push-to-talk voice communication device configured to send and receive ½ duplex wireless communications, the first wireless communication device having a housing and a display;
   a second wireless communication device;
   the first wireless communication device having a push-to-locate activation mechanism which detects selection of a target number corresponding to the second wireless communication device and sends a push-to-locate request for the target number to a carrier network to obtain a geographical location of the second wireless communication device using a location-based service, and which controls the display to present a geographical location of the second wireless communication device received in response to the push-to-talk request; and
   the second wireless communication device comprising:
      a display-less, keypad-less wireless push-to-talk voice communication device configured to send and receive ½ duplex wireless communications,
      a GPS receiver for providing a geographical location of the second wireless communication device through the location-bases service,
      a first mode where the second wireless communication device only accepts calls from predetermined numbers, and a second mode where the second wireless communication device accepts call from numbers in addition to the predetermined numbers,
      a housing, a call activation mechanism situated on the housing, a memory storing a predetermined number of contacts, and a controller configured to initiate an outgoing call to one of the predetermined number of contacts upon activation of the call actuation mechanism, the controller further configured to limit outgoing calls to the predetermined number of contacts, the call actuation mechanism including a plurality of call selection buttons each corresponding to a respective contact of the selected number of contacts, the housing of the second wireless communication device having a plurality of icons, each icon associated with a respective call selection button and comprising a visual identifier for the contact associated with the respective call selection button, and each call selection button being a push-to-talk button, the second wireless communication device including phone number information mapped to each respective push-to-talk button by a method including programming each push-to-talk button with phone number information by a user accessing a web page on the Internet, the user entering phone number information for each push-to-talk button, and the second wireless communication device receiving over-the-air messages with phone number information for each push-to-talk button, and mapping the phone number information for each push-to-talk button with each respective push-to-talk button.

2. The wireless communication system of claim 1, wherein the first wireless, push-to-talk communication device includes a push-to-talk button, a module to provide a displayed list of contact names and numbers, a module to display a list of menu options including a push-to-locate menu option, a module to detect actuation of the push-to-talk button; a module to detect selection of a target name and number corresponding to the second wireless, display-less, keypad-less communication device from the displayed list of contact names and numbers; and a module to detect selection of a push-to-locate menu option of the displayed list of menu options prior to sending a push-to-locate request for the target name and number to the carrier network.

3. A wireless communication and location system for geographically locating a target wireless communication device, comprising:
   at least one base station;
   a target wireless communication device configured to place a call to and receive an incoming call from a contact of a predetermined, limited number of contacts, and to limit outgoing calls to the predetermined number of contacts, the incoming calls being push-to-talk calls;
   the target wireless communication device comprising:
      a display-less, keypad-less wireless push-to-talk voice communication device configured to send and receive ½ duplex wireless communications, the target wireless communication device including a GPS receiver for providing a geographical location of the target wireless communication device through a location-based service, the target wireless communication device including a housing, a call activation mechanism situated on the housing, a memory storing a predetermined number of contacts, and a controller configured to initiate an outgoing call to one of the predetermined number of contacts upon actuation of the call actuation mechanism, the controller further configured to limit outgoing calls to selection buttons each corresponding to a respective contact of the selected number of contacts, the housing of the target wireless communication device having a plurality of icons associated with a respective call selection button and comprising a visual identifier for the contact associated with the respective call selection button, and each call selection button being a push-to-talk button, and the target wireless communication device including phone number information mapped to each respective push-to-talk button by a method including programming each push-to-talk with phone number information by a user accessing a web page on the Internet, the user entering phone number information for each push-to-talk, and the second wireless communication device receiving over-the-air messages with phone number information for each push-to-talk button, and mapping the phone number information for each push-to-talk button with each respective push-to-talk button,
   a locating wireless communication device configured to send and receive ½ duplex wireless push-to-talk voice communication device communicatively coupled with the target wireless communication device through the at least one base station and which obtains and displays the geographical location of the target wireless communication device.

4. The wireless communication device of claim 3, wherein the locating wireless communication device includes a housing, a push-to-locate activation mechanism configured to detect selection of a target number corresponding to the target wireless communication device and send a push-to-locate request for the target number to a carrier network via the at least one base station to obtain a geographical location of the target wireless communication device using a location-based service; and a display configured to present a geographical location of the target wireless communication device responding to the push-to-locate request.

5. The wireless communication device of claim 4, wherein the locating wireless communication device including a push-to-talk button, a module to provide a displayed list of contact names and numbers, a module to display a list of menu options including a push-to-locate menu option, a module to detect actuation of the push-to-talk button; a module to detect selection of a target name and number corresponding to the target wireless, display-less, keypad-less communication device from the displayed list of contact names and numbers; and a module to detect selection of a push-to-locate menu option of the displayed list of menu options prior to sending a push-to-locate request for the target name and number to the carrier network.

6. A method of geographically locating a second wireless communication device using a wireless communication device including a push-to-locate actuation mechanism, and a display, comprising:
  detecting selection of a push-to-locate activation mechanism at the first wireless communication device, which is a push-to-talk voice communication device configures to send an receive ½ duplex wireless communications;
  detecting selection of a target number at the first wireless communication device, the target number corresponding to a second communication device which is a display-less, keypad-less wireless push-to-talk voice communication device configured to send and receive ½ duplex wireless communication, the second wireless communication device includes a GPS receiver for providing a geographical location of the second wireless communication device through a location-based service, the second wireless communication device including a housing, a call activation mechanism situated on the housing, a memory storing a predetermined number of contacts, and a controller configured to initiate an outgoing call to one of the predetermined numbers of contacts upon actuation of the call actuation mechanism, the controller further configured to limit outgoing calls to the predetermined number of contacts, the call actuation mechanism including a plurality of call selection buttons each correspond to a respective contact of the selected number of contacts, the housing of the target wireless communication device having a plurality of icons, each icon associated with a respective call selection button and comprising a visual identifier for the contact associated with the respective call selection button, and each call selection button being a push-to-talk, the second wireless communication device including phone number information mapped to each respective push-to-talk button by a method including programming each push-to-talk button with phone number information by a user accessing a web page on the Internet, the user entering phone number information for each push-to-talk button, and the second wireless communication device receiving over-the-air messages with phone number information for each push-to-talk button, and mapping the phone number information for each push-to-talk button with each respective push-to-talk button;
  establishing a connection with a carrier network;
  sending a push-to-locate request for the target number to the carrier network to obtain a geographical location of the second wireless communication device using location-based service;
  receiving the geographical location of the second communication device;
  displaying the geographical location of the second wireless communication device on a display at the first wireless communication device.

7. The method of claim 6, wherein the first wireless communication device includes a push-to-talk button, a module to provide a displayed list of contact names and numbers, and module to display a list of menu options including a push-to-locate menu option, and the method further includes detecting actuation of the push-to-talk button; detecting selection of a target name and number corresponding to the second wireless, display-less, keypad-less communication device from the displayed list of contact names and numbers; and detecting selection of a push-to-locate menu option of the displayed list of menu options prior to sending a push-to-locate request for the target name and number to the carrier network.

8. The method of claim 6, further comprising limiting outgoing voice or push-to-talk calls from the second wireless, display-less communication device to a predetermined number of contacts.

9. The system of claim 3, wherein the locating wireless communication device has a push-to-locate activation mechanism configured to send a push-to-locate request for a target number corresponding to a target wireless communication device to a carrier network via the at least one base station to obtain a geographical location of the target wireless communication device, and target wireless communication device has no location activation mechanism for obtaining geographical location of other wireless communication devices.

10. The system of claim 3, wherein the locating wireless communication device further comprises a plurality of light sources, each light source being located behind a respective icon, and a light activation module which actuates the respective light sources in response to incoming calls from contacts associated with the respective call selection buttons, whereby a light source is actuated to illuminate a respective icon in response to an incoming call from the contact corresponding to the call selection button associated with that respective icon.

* * * * *